Feb. 9, 1937.  E. C. S. CLENCH  2,070,470
BRAKE
Filed Aug. 29, 1935  3 Sheets-Sheet 1

Inventor
Edward C. S. Clench
By [signature]
Atty.

Feb. 9, 1937. E. C. S. CLENCH 2,070,470
BRAKE
Filed Aug. 29, 1935 3 Sheets-Sheet 2
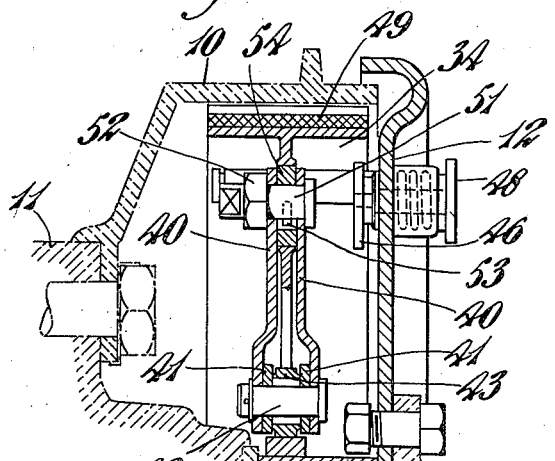
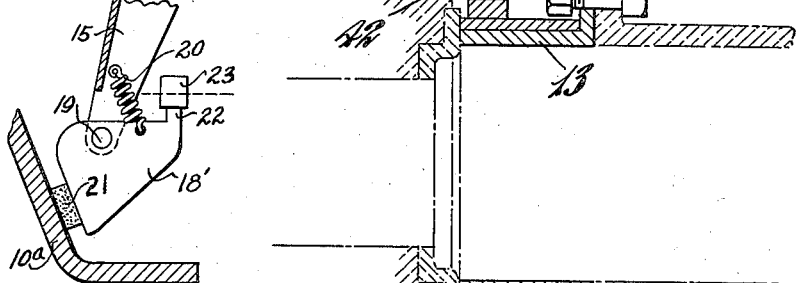
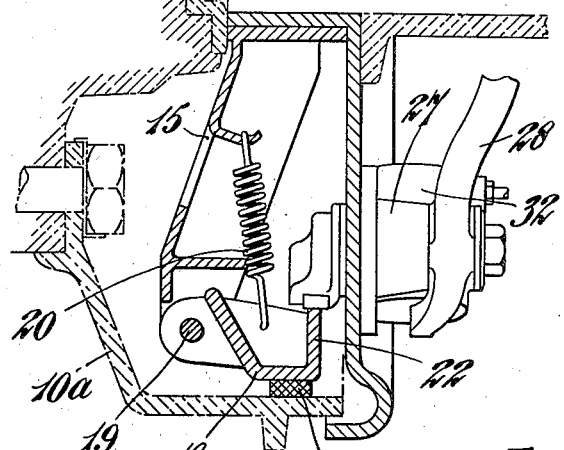
Inventor
Edward C. S. Clench
By Jo. Smirie
Atty.

Feb. 9, 1937. E. C. S. CLENCH 2,070,470
BRAKE
Filed Aug. 29, 1935 3 Sheets-Sheet 3
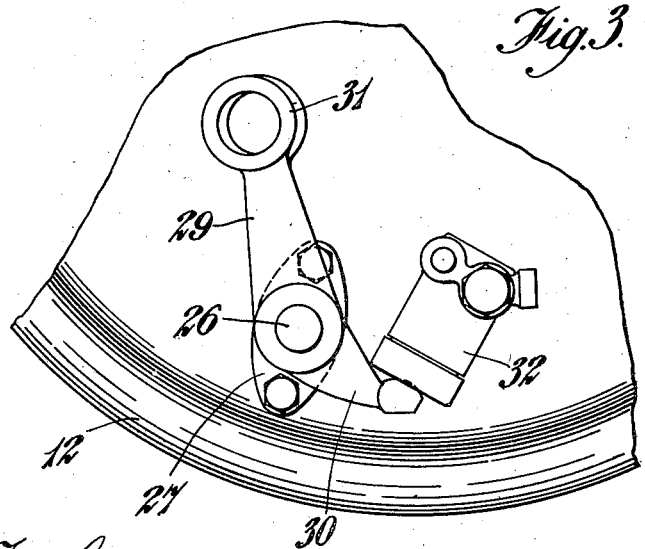
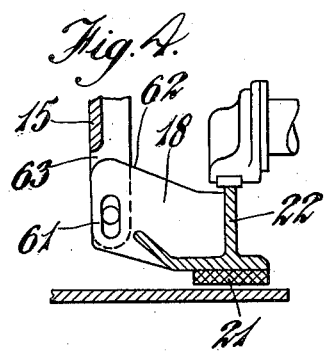
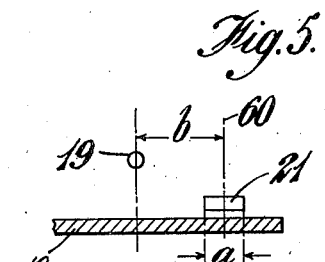
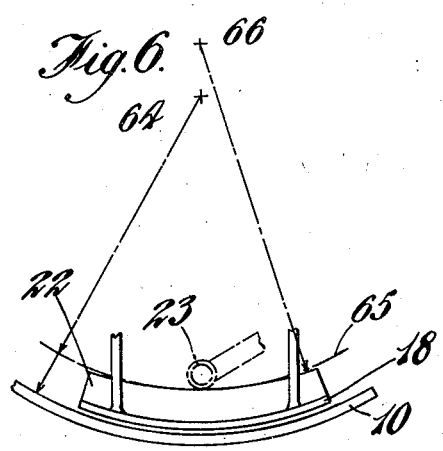
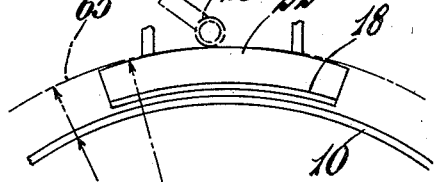
Inventor
Edward C. S. Clench
by Jo. Lurie
Atty.

Patented Feb. 9, 1937

2,070,470

UNITED STATES PATENT OFFICE 2,070,470

BRAKE

Edward Claude Shakespeare Clench, Leamington Spa, England, assignor to Automotive Products Company Limited, London, England Application August 29, 1935, Serial No. 38,459
In Great Britain September 29, 1934

8 Claims. (Cl. 188—78)

This invention relates to servo brakes for vehicles and exclusively to those of the relay servo type, in which a shoe or equivalent element is arranged to coact frictionally with a moving part which it is desired to retard, and is mounted to execute a limited movement therewith so as to transfer applying force to a main brake through means providing a mechanical advantage, the arrangement being such that the system is devoid of any "self wrapping" servo tendency and thus has complete progressiveness, i. e. capability of obtaining smooth application and release of the main brake in accordance with increase and decrease of the pressure applied to the relay shoe.

It is the object of the present invention to provide an improved construction of relay servo brake which is found in service to be extremely efficient, and which, moreover, is compact and capable of providing a comparatively high braking torque in relation to its size and weight.

The present invention accordingly provides a relay servo drum brake in which the relay shoe or equivalent element is mounted so that its movement into and out of contact with the frictional surface of the drum can take place about an axis extending in a tangential direction parallel with the plane of rotation of the brake drum. The invention further provides a relay servo brake having self-contained main braking means and a relay shoe, the relay shoe being carried by a radially extending arm and being pivoted thereto for movement about an axis extending parallel with the plane of rotation of the brake for effecting its normal applying movement.

As a still further feature the invention provides a relay servo brake in which the relay shoe is arranged for pivotal movement about an axis extending parallel with the plane of rotation, and is provided with an arcuate track engaged by means for applying the servo shoe, at the same time permitting the requisite arcuate movement of said relay shoe for applying the main braking means, said arcuate track being arranged eccentrically with respect to the axis of rotation of the brake so that the extent of application of the relay shoe tends to diminish as the main braking means is applied, thus ensuring a smooth action devoid of "snatch" and harshness. Thus, in a relay brake in which the relay shoe is applied outwards with respect to the brake axis by pressure applied to the interior of an arcuate track on said relay shoe, the radius of said track should be substantially greater than would be required to render said track concentric with the brake axis, such increase in radius conveniently being between 5% to 20%. Moreover, to provide a satisfactory frictional engagement between the relay shoe and the brake drum, the width of the area of contact of said relay shoe taken in a radial plane should be at all parts less than one half the distance between the plane of revolution containing the centre line of said area of contact and the pivotal axis of the relay shoe mounting. The improved brake may conveniently comprise in combination a brake drum having main braking means, a radial arm pivotally mounted for angular movement about the axis of the brake, but otherwise restrained, a relay shoe carried by the outer end of said arm and permitted to move angularly about an axis extending parallel with the plane of rotation of the brake so as to engage frictionally with said drum, means for moving the relay shoe into contact with the drum, and means whereby angular movement of the arm applies the main braking means. If desired, the relay shoe may be loosely pivoted so as to permit the frictional surface of said shoe to bed uniformly against the surface of the brake drum. Also a cam arranged for angular movement about the brake axis under the influence of the relay shoe may conveniently act upon a toggle linkage which expands the main braking means into contact with a surrounding brake drum, while means may be provided for adjusting the clearance of the main braking means to compensate for wear, appropriate provision being made for regulating the main brake operating means correspondingly.

The invention is illustrated by way of example in the accompanying drawings in which Figure 1 is a front elevation of an improved relay servo brake, the drum being removed;

Figure 2 is a side sectional elevation taken on the line 2—2 of Figure 1;

Figure 3 is a fragmentary rear elevation showing the relay shoe operating means;

Figure 4 is a fragmentary sectional view through a modified form of servo shoe;

Figure 5 is a diagram illustrating the relationship between the pivot of the relay shoe and the lining thereof;

Figures 6 and 7 are diagrams showing the eccentric arrangement of the relay shoe track when said shoe is disposed inside and outside respectively of a brake drum;

Figure 8 is a fragmentary side elevation, partly in section, showing a modified arrangement of relay shoe.

Figure 1:
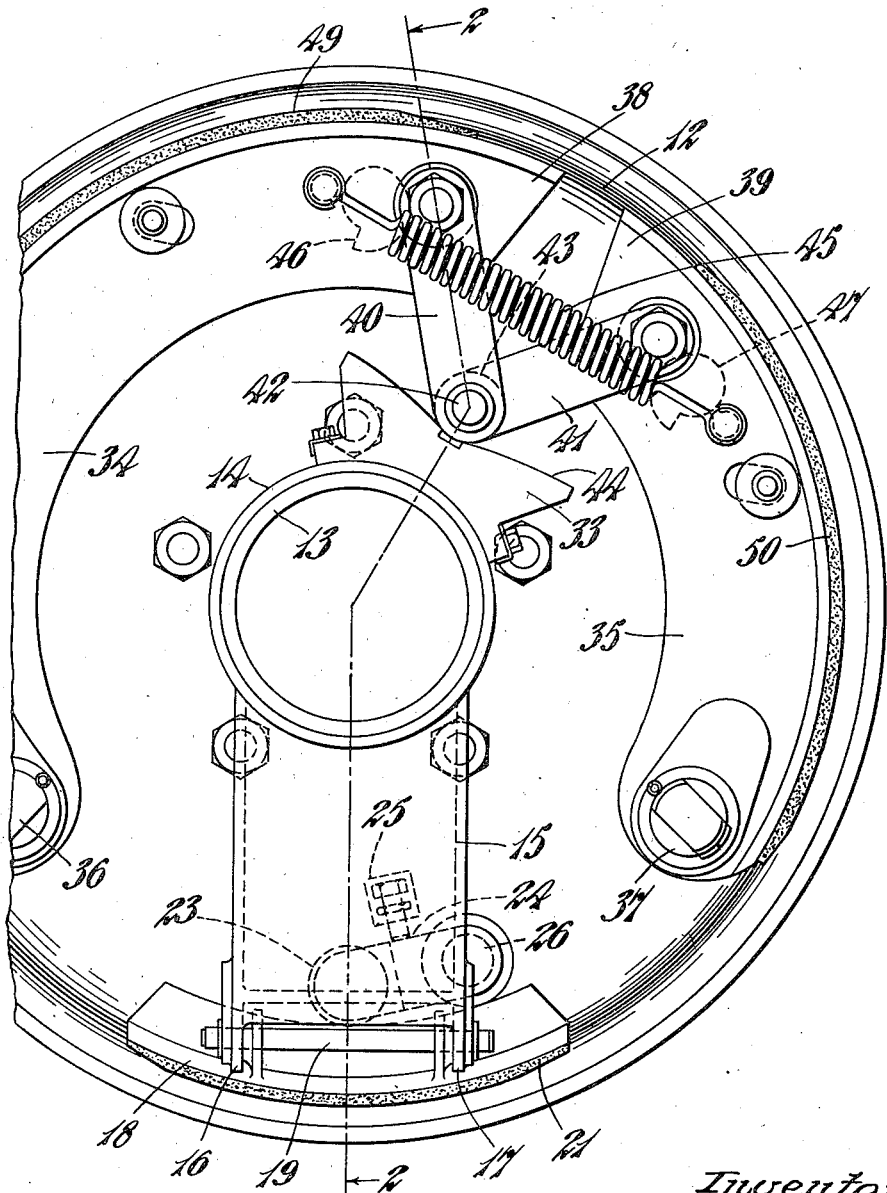

Referring to Figures 1, 2 and 3, the improved construction of relay brake comprises a drum 10 of the conventional form carried by a vehicle wheel, indicated at 11, and arranged to rotate therewith relative to a fixed backing plate 12. A tubular bearing 13 conveniently formed in one with the backing plate 12 carries a sleeve 14 which is free to move angularly about the axis of the brake drum but is otherwise constrained, said sleeve 14 being formed with a radial relay arm 15, the lower part of which is provided with a pair of parallel depending ears 16 and 17. To these a relay shoe 18 is pivotally connected by means of a pin 19 which lies parallel with the plane of rotation of the brake, the relay shoe being normally held out of contact with the brake drum 10 by means of a coiled tension spring indicated at 20.

This relay shoe is in the form of an arcuately shaped trough member carrying a strip 21 of brake lining material, and formed with a radially extending arcuate track 22 which is engaged by a roller 23 carried by an arm 24, a stop 25 being provided for limiting the clearance of the relay shoe lining 21. The arm 24 is attached to a shaft 26 passing through the backing plate 12, and a bush 27 carried thereby. At its outer end the shaft 26 is connected to an operating lever 28, the general form of which is shown in Figure 3, from which it will be seen that it is provided with two arms 29 and 30, the first of which is formed with an eye 31 for attachment of mechanical operating means, such for example as a cable or rod, while the lower arm 30 coacts with the plunger of a hydraulic cylinder 32 carried by the backing plate 12, but, it will be noticed, on the outside thereof, thus enabling the cylinder 32 to be shielded to a large extent from the heat produced by the brake.

Towards its upper part the sleeve 14 carries a somewhat V-shaped cam 33, and when this is moved angularly in either direction from the neutral position shown in Figure 1, it serves to apply the main braking means, consisting in the case illustrated of a pair of arcuate brake shoes 34 and 35 pivoted at 36 and 37 respectively to the backing plate 12. The free ends 38 and 39 are connected by a toggle linkage, the respective links being indicated at 40 and 41 and a roller 43 is carried by a pin 42 joining the links 40 and 41, which roller is arranged to engage the operative surface 44 of the cam 33. Thus, when the brake drum 20 is rotating and the relay shoe 18 is applied by means of the roller 23, the arm 15 and sleeve 14 are moved angularly owing to the frictional drag on the lining 21, thus tending to straighten the toggle linkage 40, 41 by pressing the centre part radially outwards and so applying the brake shoes 34 and 35 against the influence of the usual pull off spring 45. The extent of this return movement of the shoes 34 and 35 can be regulated by means of involute or other stops 46, 47 controlled from outside the brake by knobs or the like, one of which is shown at 48 in Figure 2, thus compensating for wear in the linings 49 and 50 of the main braking means. As, however, this restriction of return movement would ordinarily prevent the roller 43 from contacting with the cam 33 when the latter is in its neutral position, an equivalent adjustment is provided for the links 40, 41, said adjustment being shown in Figure 2. The link 40, as well as the link 41, is formed from a pair of stampings which are held together by a bolt 51 having a nut 52, and provided with a radial pin 53 engaging a keyway formed in an eccentrically bored bush 54 accommodated in the web of the brake shoe 34. Normally the parts of the link 40 and the bush 54 are held firmly together by the bolt 51 and nut 52, any required pivotal movement between the link 40 and the shoe 34 taking place around the outside of the bush 54. By loosing the nut 52 and rotating the bolt 51, the virtual length of the link 41 can be altered thus restoring the roller 43 to its normal neutral position, a corresponding form of adjustment being provided between the link 41 and the brake shoe 35.

In order to provide a smooth applying movement for the brake as a whole, and particularly to overcome variations in the extent to which the pressure applied to the servo shoe 18 is apparently magnified by the relay servo action of the brake, there are two points which require careful attention. The first of these is the arrangement and disposition of the relay shoe and the transverse pivot thereof. Where the relay shoe 18 is snugly pivoted to the relay arm 15, the width $a$ of the lining 21 as shown in Figure 5 should not be in excess of half the distance $b$ from the axis of the pivot pin 19 to the centre line 60 of said lining 21. The reason for this is readily apparent when it is realized that the relay shoe virtually acts as a lever having a fixed fulcrum, the rim of the rail 22 being the point of application of the force, and the reaction between the brake drum 10 and the lining 21 being the load. When the lining 21 extends close to the pivot 19, it is found in practice that the actual centre of pressure between the lining and the brake drum varies considerably from time to time, thus, of course, varying the torque imparted by the relay shoe to the arm 15, and so reproducing such variations to a magnified extent in the retarding torque of the main braking means. This difficulty, however, can be overcome by making the ratio $a/b$ not more than one half as previously mentioned. This limitation may, however, be avoided where the relay shoe 18 is loosely mounted as by a pin and slot device 61 shown in Figure 4, where the relay shoe is provided with upwardly extending ears 62 which engage corresponding parts 63 on the arm 15 for preventing tilting movement of the relay shoe in the plane of rotation of the brake. In these circumstances, however, it is essential that the rail 22 should be centrally disposed with regard to the lining 21 so that the pressure applied by the roller 23 is evenly distributed.

The other point requiring special attention is the radius of curvature of the rail 22, and this should be arranged so that the arcuate track of the roller 23 is eccentric with regard to the axis of the brake, the sense of said eccentricity being such that the extent of application of the relay shoe tends to diminish as the angle of deflection of the arm 15 increases. This is shown in Figure 6, where the brake axis is indicated at 64. The broken line 65 indicates the position of the head of the track 22 if the latter were arranged concentrically, but in practice said track 22 is struck from the centre 66 and has a radius which can conveniently be 5% to 20% in excess of the "concentric" radius. In cases where the relay shoe 18 acts upon a convex surface, such for example as is shown in Figure 7 where it co-operates with the exterior of a brake drum 10, the outer radius of the track 22 is smaller than that which would produce concentricity.

It will be understood that the various features of the invention can be incorporated in a number of designs of relay servo brakes, and the relay shoe or equivalent element may be arranged to co-operate with any desired part of the brake drum or the like to be frictionally retarded, for example the outside as indicated in Figure 7. Thus, in the arrangement shown in Figure 8 the shoe 18' carries a lining 21 adapted to bear against the radial surface 10a of the drum 10 when a roller 23 is forced against an arcuate track provided upon the shoe 18'. Moreover, various means other than those described may be used for actuating the relay shoe and for connecting this operatively with the main braking means, the relay shoe in all cases, however, being mounted so as to be capable of executing pivotal movement about an axis extending substantially parallel with the plane of rotation of the brake. It will be seen from the foregoing that this arrangement is very advantageous in practice, since it permits a compact construction of relay servo brake to be produced and at the same time enables a satisfactory control of the relay shoe to be obtained, which control is unaffected, or at the most is only desirably affected, by the angular drag movement of the relay shoe, used for applying the main braking means.

I claim:—

1. A brake comprising in combination, a drum, a main friction means engageable with the drum, an arm extending radially of the drum and displaceable angularly about the drum axis to actuate the main friction means, and a relay friction shoe mounted on the arm for pivotal movement into and out of engagement with the drum about an axis within the drum and extending parallel with the plane of rotation of the drum.

2. A brake comprising in combination, a drum, a member angularly displaceable about the drum axis, a main friction means engageable with the drum by angular displacement of the member, a relay friction means provided with an arcuate track and pivoted on the member for movement into and out of engagement with the drum, about an axis extending parallel with the plane of rotation of the drum, and means engaging the arcuate track for applying the relay friction means, said arcuate track being arranged eccentrically from the drum so that the extent of application of the relay friction means diminishes as the main friction means is applied.

3. A brake comprising in combination, a drum, a relay friction means adapted to be applied radially outward with respect to the brake axis by pressure applied to the interior of an arcuate track formed on said relay friction means, and a main friction means engageable with the drum by angular displacement of the relay friction means about the drum axis, the radius of said track being substantially greater than would be required to render said track concentric with the brake axis.

4. A brake as claimed in claim 3, wherein the track radius is in excess of the corresponding radius required to produce concentricity by an amount between 5% to 20% of said corresponding radius.

5. A brake comprising in combination, a drum, a relay friction means pivoted for movement into and out of engagement with the drum about an axis extending in a tangential direction parallel with the plane of rotation of the drum, and a main friction means engageable with the drum by angular displacement of the relay friction means about the drum axis, the width of the area of contact of the relay friction means against the drum taken in a radial plane, being at all parts less than one half the distance between the plane of revolution containing the center line of said area of contact and the pivotal axis of the relay friction means.

6. A brake comprising in combination, a brake drum, main braking means, a radial arm pivotally mounted for angular movement about the axis of the drum but otherwise restrained, means whereby angular movement of the arm applies the main braking means, a relay shoe carried by the outer end of said arm, and permitted to move angularly about an axis extending parallel with the plane of rotation of the drum and so as to engage frictionally with said drum, means for moving the relay shoe into contact with the drum, comprising an arcuate track upon that side of the relay shoe remote from the surface contacting with the drum, and a roller engaging with said track.

7. A brake as claimed in claim 6, wherein the relay friction means is pivoted with clearance so as to permit the frictional surface of said means to bed uniformly against the surface of the drum.

8. A brake comprising in combination a drum, a relay friction means mounted for movement into and out of engagement with the drum about an axis extending in a tangential direction parallel with the plane of rotation of the drum, a main friction means engageable with the drum by angular displacement of the relay friction means about the drum axis, means for adjusting the clearance of the main braking means to compensate for wear, and means for correspondingly regulating the main brake operating means.

EDWARD CLAUDE
SHAKESPEARE CLENCH.